United States Patent
Levenduski et al.

(10) Patent No.: US 6,393,861 B1
(45) Date of Patent: May 28, 2002

(54) THERMAL STORAGE APPARATUS AND METHOD FOR AIR CONDITIONING SYSTEM

(76) Inventors: Robert Levenduski, 6774 Snead Ct., Niwot, CO (US) 80503; James Marsh Lester, P. O. Box 340, Carbondale, CO (US) 81623

( * ) Notice: Subject to any disclaimer, the term of this patent is extended or adjusted under 35 U.S.C. 154(b) by 0 days.

(21) Appl. No.: 09/661,984

(22) Filed: Sep. 14, 2000

Related U.S. Application Data

(60) Provisional application No. 60/154,643, filed on Sep. 17, 1999.

(51) Int. Cl.[7] ............................................. F25D 17/02
(52) U.S. Cl. ............................ 62/434; 62/430; 62/59; 62/129; 62/181; 165/10
(58) Field of Search ...................... 62/430, 434, 439, 62/129, 59, 181; 165/10

(56) References Cited

U.S. PATENT DOCUMENTS

| | | | |
|---|---|---|---|
| 1,496,676 A | | 6/1924 | Jauvert |
| 2,996,894 A | * | 8/1961 | Shade ............................ 62/59 |
| 3,938,352 A | | 2/1976 | Schmidt ....................... 62/279 |
| 3,976,123 A | | 8/1976 | Davies ........................... 165/29 |
| 4,123,914 A | | 11/1978 | Perez et al. .................. 62/196 |
| 4,609,036 A | | 9/1986 | Schrader ....................... 165/10 |
| 4,637,219 A | * | 1/1987 | Grose ........................... 62/199 |
| 4,720,984 A | * | 1/1988 | Ames ........................... 62/434 |
| 4,964,279 A | * | 10/1990 | Osborne ......................... 62/59 |
| 5,036,904 A | * | 8/1991 | Kanda et al. .................. 165/10 |
| 5,239,839 A | | 8/1993 | James ........................... 62/434 |
| 5,277,038 A | * | 1/1994 | Carr ............................. 62/434 |
| 5,297,397 A | | 3/1994 | Pointer ....................... 62/238.6 |
| 5,553,463 A | | 9/1996 | Pointer ....................... 62/238.6 |
| 5,680,898 A | | 10/1997 | Rafalovich et al. .......... 165/236 |

FOREIGN PATENT DOCUMENTS

| | | | | | |
|---|---|---|---|---|---|
| JP | 4-327790 A | * | 11/1992 | | 62/430 |
| JP | 5-45008 A | * | 2/1993 | | 62/430 |
| JP | 5-71808 A | * | 3/1993 | | 62/430 |
| JP | 5-264078 A | * | 10/1993 | | 62/430 |

* cited by examiner

*Primary Examiner*—William Doerrler
*Assistant Examiner*—Melvin Jones
(74) *Attorney, Agent, or Firm*—Sheridan Ross P.C.

(57) ABSTRACT

A thermal energy storage unit is provided in connection with an air conditioning or refrigeration condenser. Working fluid waste heat is stored in the thermal energy storage unit during at least a relatively hot part of the day. Heat stored in the thermal energy storage unit is then rejected to the air during a cooler period, such as night. By rejecting the stored heat directly to the atmosphere, there is no need to provide an energy-consumptive refrigeration cycle for cooling the thermal storage medium material. In this way, a refrigeration system compressor has a reduced load and/or reduced duty cycle during hot parts of the day and relatively less energy can be used during high-demand times when energy may be more expensive.

30 Claims, 5 Drawing Sheets

THERMAL STORAGE APPARATUS AND METHOD FOR AIR CONDITIONING SYSTEM

This application claims priority from U.S. Provisional Patent Application No. 60/154,643 filed on Sep. 17, 1999. The entire disclosure of the provisional application is considered to be part of the disclosure of the accompanying application and is hereby incorporated by reference.

Cross reference is made to Disclosure Document No. 431,861, titled "Energy Saving Air Conditioning or Refrigeration System" of Robert Levenduski and James Marsh Lester, dated Feb. 16, 1998 and received in the U.S. Patent and Trademark Office on Feb. 26, 1998.

The present invention relates to a method and apparatus for air conditioning systems which involves a thermal storage unit and in particular to a unit which can store heat when ambient air temperature is high and release stored heat directly to ambient air when ambient air temperature is lower.

BACKGROUND INFORMATION

A typical refrigeration circuit such as the type used for air conditioning, refrigeration and the like, includes, among other components, a condenser unit for removing heat from the working fluid. In a typical house or building air conditioning system, the condenser is placed outdoors and includes an arrangement of tubing, often coupled to fins, or other heat dispersing units, and often provided with a fan or similar device for providing air flow over the coils and fins. In this way, heat may be transferred from the working fluid substantially directly (i.e., by heat traveling only through the walls or surfaces of the coils or fins) to the ambient air. Because heat flows only from warmer to cooler bodies, the working fluid can be cooled, in such condenser, only if the temperature of the working fluid is higher than the temperature of the ambient air. When the ambient air temperature is relatively high, such as on summer afternoons when air conditioning is likely to be used, it may be necessary to provide relatively high compression of the working fluid in order to achieve a working fluid temperature which exceeds ambient air temperature. Such high compression can be relatively energy consumptive creating high demand for electrical energy. In many situations, energy is priced such that its cost is higher during high demand times and accordingly traditional air conditioning systems can be relatively expensive to operate.

One approach to this situation has been to provide a system in which working fluid heat is stored in a thermal storage medium such that the storage medium can be cooled, using a refrigeration process, at a later time. Although this approach may provide certain benefits, it requires the use of a refrigeration unit, and thus the consumption of electrical power, for cooling the heat storage medium, albeit, possibly at a time of lower ambient air temperature. The consumption of electricity for a refrigeration process (e.g. to run a compressor) can be undesirably costly. Accordingly, it would be useful to provide a system which can store some or all condenser heat, e.g., during high ambient air temperature periods, without the need for using a refrigeration unit for cooling the heat storage medium.

SUMMARY OF THE INVENTION

The present invention includes a recognition of certain problems in previous approaches including as described herein. According to one aspect of the invention, heat from the condenser coils of an air conditioning unit can be stored in a heat storage medium, preferably by melting or otherwise changing phase of some or all of the medium. Preferably, such heat storage occurs when ambient air temperature is relatively high, such as exceeding a first threshold temperature. At a later time, such as when ambient air temperature is below a second threshold temperature, the heat storage medium is cooled, not by a refrigeration cycle, but by transferring heat directly to the ambient air, e.g., blowing ambient air around containers of the heat storage medium. In this way, the heat storage medium can be cooled, for reuse in the next high-air-temperature cycle, but without the need for using refrigeration for cooling the working fluid.

Although the present invention can be implemented with a variety of heat storage materials, it is preferred to use a material which can take advantage of latent heats of phase change such as latent heats of melting and freezing. In one embodiment, a material is provided which is relatively inexpensive, has a melting/freezing point occurring at temperatures similar to temperatures found during night time ambient air temperatures and which also has a relatively high latent heat of melting/freezing. In one embodiment, the heat transfer material is a calcium chloride hydrate.

Preferably the system is configured so that it is relatively inexpensive to design, fabricate, operate, maintain or repair. In one embodiment, the heat storage material is encapsulated in containers which are sized shaped and positioned, relative to other components, to achieve both the melting and the freezing of the heat storage material in-place (i.e., without the need to pump or transfer heat storage material from a melting location to a freezing location) and preferably such that the system can be relatively easily, and preferably automatically, changed from the melting configuration to the freezing configuration. In one embodiment, a valve or switch responds to temperatures in excess of a first ambient air threshold temperature to shunt working fluid from a ordinary air-cooled condenser coil to a coil in contact with the heat storage medium. In one embodiment, the system responds to a temperature which is below a second threshold temperature, by using a simple switch or valve to provide desired air flow for cooling the heat storage medium such as by activating a fan or blower.

In this way, a system according to the present invention can not only relieve some or all of the compressor burden normally imposed by high ambient air temperatures (thus reducing operating energy consumption and, possibly reducing wear on compressor components) but also reduce energy costs by reducing the amount of energy which is consumed during relatively high-energy-cost periods.

In one aspect a thermal energy storage unit is provided in connection with an air conditioning or refrigeration condenser. Working fluid waste heat is stored in the thermal energy storage unit during at least a relatively hot part of the day. Heat stored in the thermal energy storage unit is then rejected to the air during a cooler period, such as night. By rejecting the stored heat directly to the atmosphere, there is no need to provide an energy-consumptive refrigeration cycle for cooling the thermal storage medium material. In this way, a refrigeration system compressor has a reduced load and/or reduced duty cycle during hot parts of the day and relatively less energy can be used during high-demand times when energy may be more expensive.

DETAILED DESCRIPTION OF THE PREFERRED EMBODIMENT

Figure 1A:
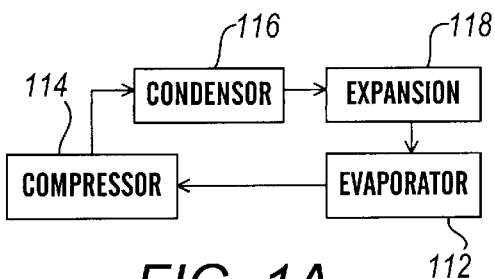
FIG. 1A is a block diagram of a conventional refrigeration system.

Depicted in FIG. 1A, in a conventional system, working fluid, returning from an evaporator 112 is compressed, to a relatively high pressure, by a compressor 114. The relatively high pressure and high temperature working fluid is cooled in the condenser 116 typically by transferring working fluid heat to the ambient air, and typically converting the working fluid from a vaporous state to a liquid state. The condensed working fluid is expanded to a lower pressure and temperature through an expansion valve or capillary 118 and provided to the evaporator 112 where heat is absorbed, e.g., ultimately from a room or building being air conditioned, boiling the working fluid and changing it to a vaporous state.

Figure 2:
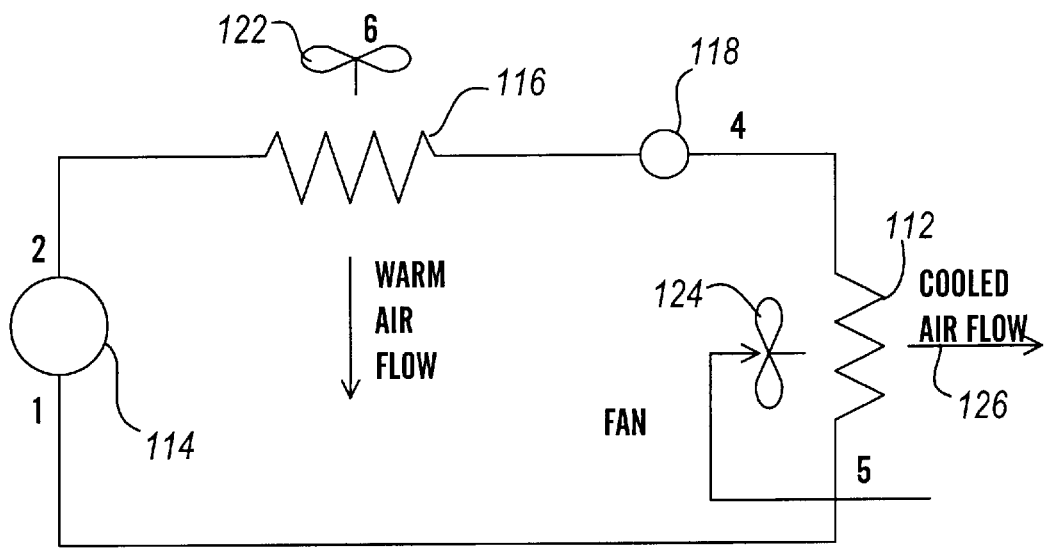
FIG. 2 is a block diagram of a refrigeration system according to previous approaches.

Referring to FIG. 2, the working fluid temperature, at the point it enters the compressor 114, is typically warmer than the refrigerant boiling point such that the working fluid is in a vaporous state, but it is typically lower than ambient air temperature. The compressor 114 raises the pressure of the fluid and accordingly raises its temperature. Typically, the temperature of the working fluid as it exits the compressor 114 must be higher than the ambient air temperature if, as is typical in prior devices, the working fluid is to be air-cooled. Thus, when ambient air temperatures are relatively high, such as 100° F. or more, compressor 114 must provide sufficient compression to raise the temperature above the ambient air temperature creating a relatively heavy load on the compressor and relatively high energy consumption. For example, if the ambient air temperature is 100°, the compressor 114 may, for example, provide sufficient compression to raise the temperature of the working fluid, as it exits the compressor 114 to, e.g., about 105° F. Air flow over the condenser coils 116, e.g., provided by a fan 122 cools the working fluid to approximately the ambient air temperature. The expansion valve 118 further cools the working fluid before it is provided to the evaporator 112 where working fluid is boiled, e.g., by blowing building or room air over the evaporator coils 112, e.g., using the fan 124, providing a cooled air flow 126 for use in the building or room.

Figure 3:
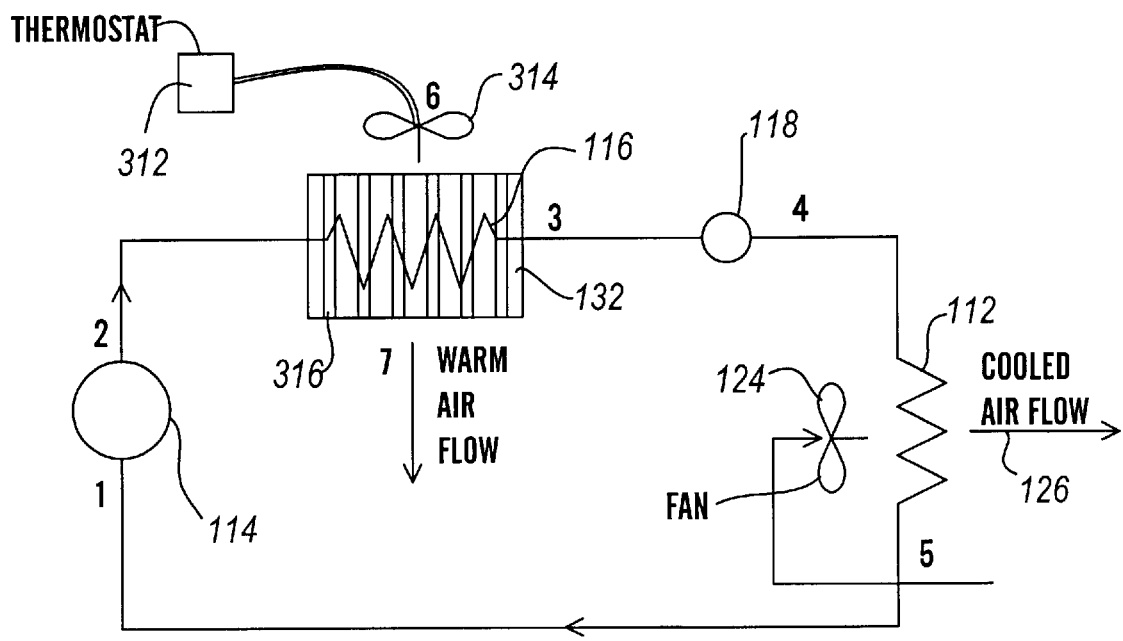
FIG. 3 is a block diagram of a refrigeration system according to an embodiment of the present invention.

In the embodiment depicted in FIG. 3, some or all of the coils of the condenser 116 are in thermal communication with a fluid storage medium of a thermal storage unit 132. Preferably, the fluid storage medium has a melting point substantially lower than expected maximum ambient air temperatures. This way, heat can be transferred from the working fluid to the thermal storage medium while the working fluid has a temperature which is greater than the melting point of the thermal storage medium, but may be less than the ambient air temperature. For example, if thermal storage medium has a melting point of about 100° F., and the ambient air temperature is about 110° F., the system depicted in FIG. 3 will provide the desired transfer of heat from the working fluid to the thermal storage medium when the working fluid is only slightly above 100° (such as about 102°) but is substantially less than the ambient air temperature. In this embodiment, because the compressor 114 is used to raise the working fluid only to about 102° (rather than a temperature greater than 110°) the load on the compressor, and the energy consumption of the compressor, during high ambient air temperature periods is reduced.

Preferably, the system is configured such that when ambient air temperatures are relatively low, such as below a first threshold temperature (which may, if desired, be set approximately equal to the melting point of the thermal storage medium) working fluid is provided to condenser coils which are air-cooled. Preferably, the ambient air temperature is sensed and, if ambient air temperature exceeds the first threshold temperature, working fluid is provided to condenser coils which are in thermal communication with the thermal storage medium and, preferably, the (relatively high temperature) ambient air will not be in substantial thermal communication with the thermal storage medium. This configuration will persist as long as the ambient air temperature is greater than the first threshold temperature. Accordingly, heat from the working fluid will continue to be transferred to the thermal storage medium, melting some or all of the thermal storage medium and, in some cases, eventually raising the temperature of the thermal storage medium.

In addition to the thermal storage unit 132, it may be desired to add a refrigerant liquid reservoir, e.g., with controls in vicinity of a thermal storage unit, to provide refrigerant pressure control over the entire range of operating conditions, so as to facilitate additional energy savings.

When the ambient air temperature is sufficiently low (typically at night) ambient air can be used to cool the thermal storage medium, thus transferring the heat which was stored in the thermal storage medium to the atmosphere. Accordingly, in one embodiment, when the ambient air temperature falls below a second threshold temperature, which may be, e.g., equal to the freezing point, or somewhat below the freezing point, of the energy storage medium, a thermostat 312 will sense this temperature and activate a fan 314 causing air flow through air flow passages 316 positioned to provide substantial thermal communication between the flowing air and the thermal storage medium, thus moving heat from the thermal storage medium, preferably lowering the temperature of, and/or refreezing, the thermal storage medium. Such lowering of the temperature and/or refreezing of a thermal storage medium during low temperature conditions prepares the system for another cycle of high ambient air temperature operation, as described above.

Figure 1B:
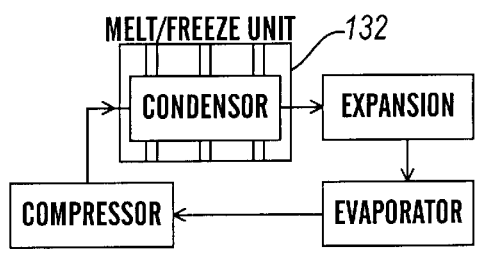
FIGS. 1B, 1C, 1D and 1E are block diagrams of systems according to embodiments of the present invention.

The thermal storage or melt-freeze unit 132 can be positioned or configured in a number of fashions. In the embodiment of FIG. 1B, the thermal storage medium of the thermal storage unit 132 is in substantially direct thermal communication with the condenser coils so that whenever the working fluid, in the condenser, exceeds the melting point of the thermal storage medium, heat will be transferred to the thermal storage medium.

Figure 1C:
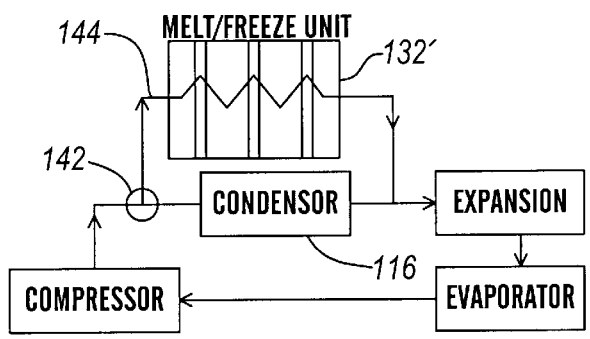

In the embodiment of FIG. 1C, a thermal storage medium 132' is provided separate from the condenser 116. In the embodiment of FIG. 1C, as long as the ambient air temperature is below the first threshold temperature, working fluid flows directly to the condenser 116 which is air cooled, e.g., using a fan, thus operating in a manner similar to the conventional configuration depicted in FIG. 1A. When ambient air temperature exceeds a threshold temperature, this condition is sensed, e.g., by a thermostat, and a switch 142 or valve is activated causing the working fluid to flow 144 into the thermal storage unit 132' which has its own set of coils, for transferring heat from the working fluid to the thermal storage medium.

Figure 1D:
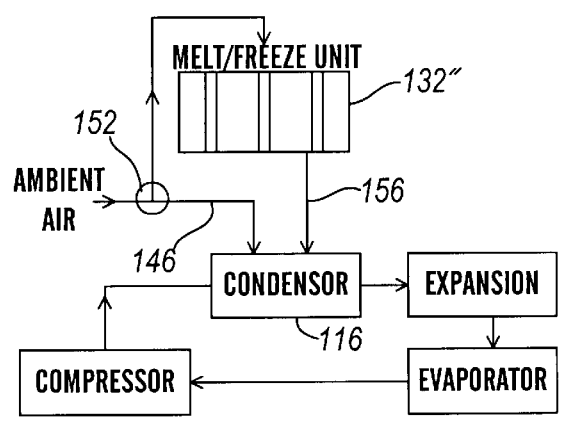

In yet another embodiment depicted in FIG. 1D, as long as ambient air temperature is below a threshold temperature, ambient air is caused to flow over the condenser 146 for operation in the conventional fashion. However, in the embodiment of FIG. 1D, if ambient temperature exceeds the first threshold temperature, a switch or valve 152 causes ambient air to first flow through the heat storage unit 132" where heat is extracted from ambient air resulting in a flow of cooled air 156 which is then flowed over the condenser 116. In this way, the condenser 116 can be provided with working fluid which has a temperature below the ambient air temperature but greater than the temperature of the cooled air flow 156.

Figure 1E:
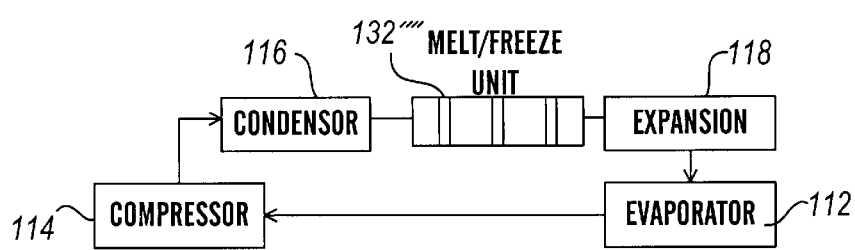

In the embodiment depicted in FIG. 1E, the thermal storage unit 132"" cools the working fluid after it has been initially cooled in the condenser 116. Preferably, the working fluid, whenever it is being output from the condenser, is placed in thermal communication with the change-of-phase material to provide substantially continuous transfer of heat to the change-of-phase material (i.e. not necessarily restricted to high ambient temperature times or particular times of day). In this situation, the heat storage unit operates as a sub-cooler for the previously condensed working fluid, generally cooling the working fluid to a temperature which is below its condensation temperature and also below the ambient temperature. At least some energy savings can be realized from the fact that sub-cooled working fluid can provide more efficient cooling than the (possibly only barely) condensed but relatively warm (i.e. no cooler than ambient air temperature) working fluid that exits the condenser in high ambient-temperature conditions. Although it is anticipated the embodiment of FIG. 1E may provide a lower magnitude of energy savings than at least some other embodiments, the embodiment of FIG. 1E may nevertheless present an attractive cost/benefit ratio, at least because the heat storage unit 132"" can more readily be provided in smaller, simpler and less expensive form. Furthermore the embodiment of FIG. 1E can readily be used to retrofit existing air conditioning units since (from the point of view of working fluid flow) it can be spliced-in downstream of the condenser, and there is little or no need to modify the condenser or other components of the system.

Figure 4:
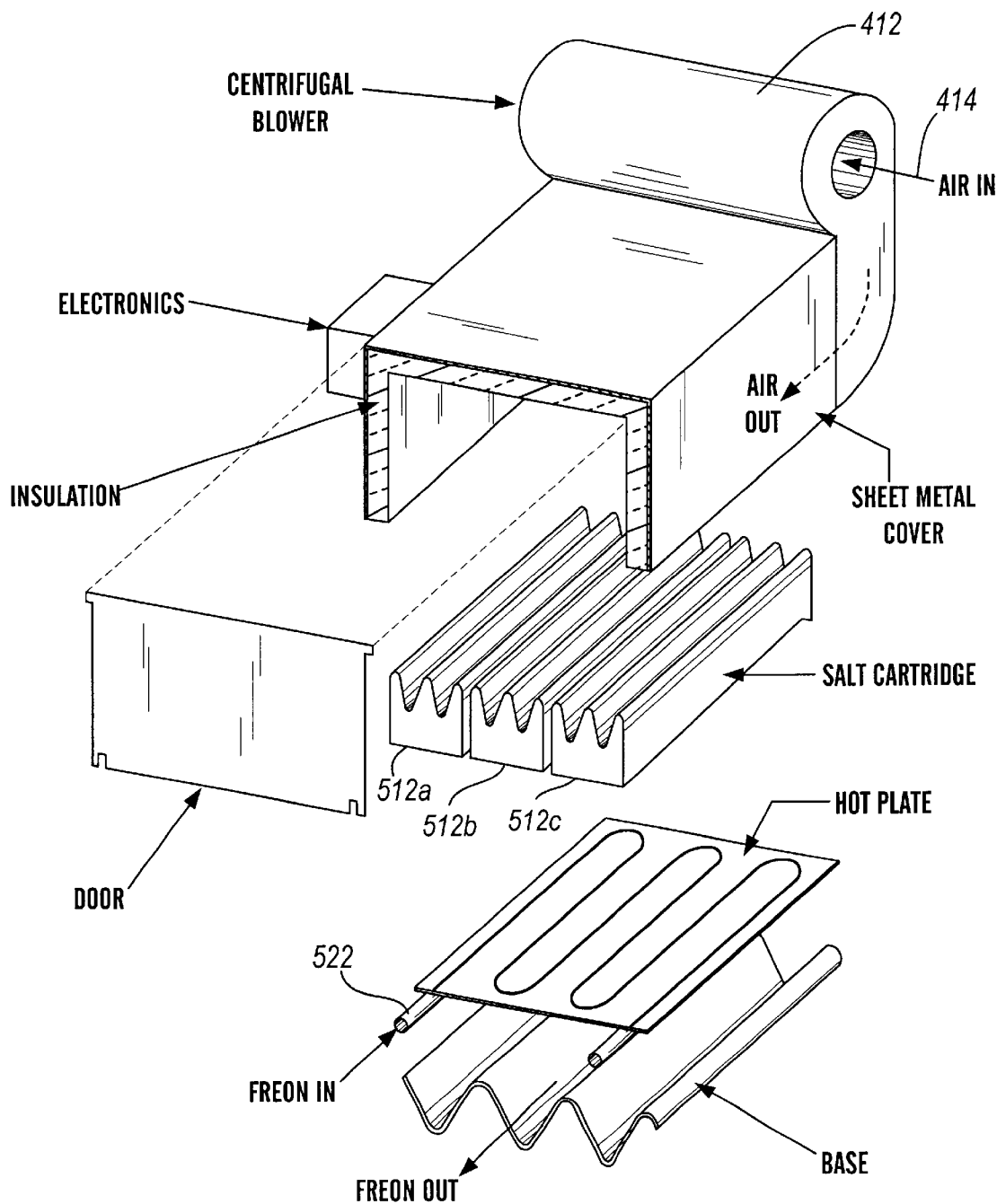
FIG. 4 is an exploded perspective view of a heat storage unit according to an embodiment of the present invention.
Figure 5:
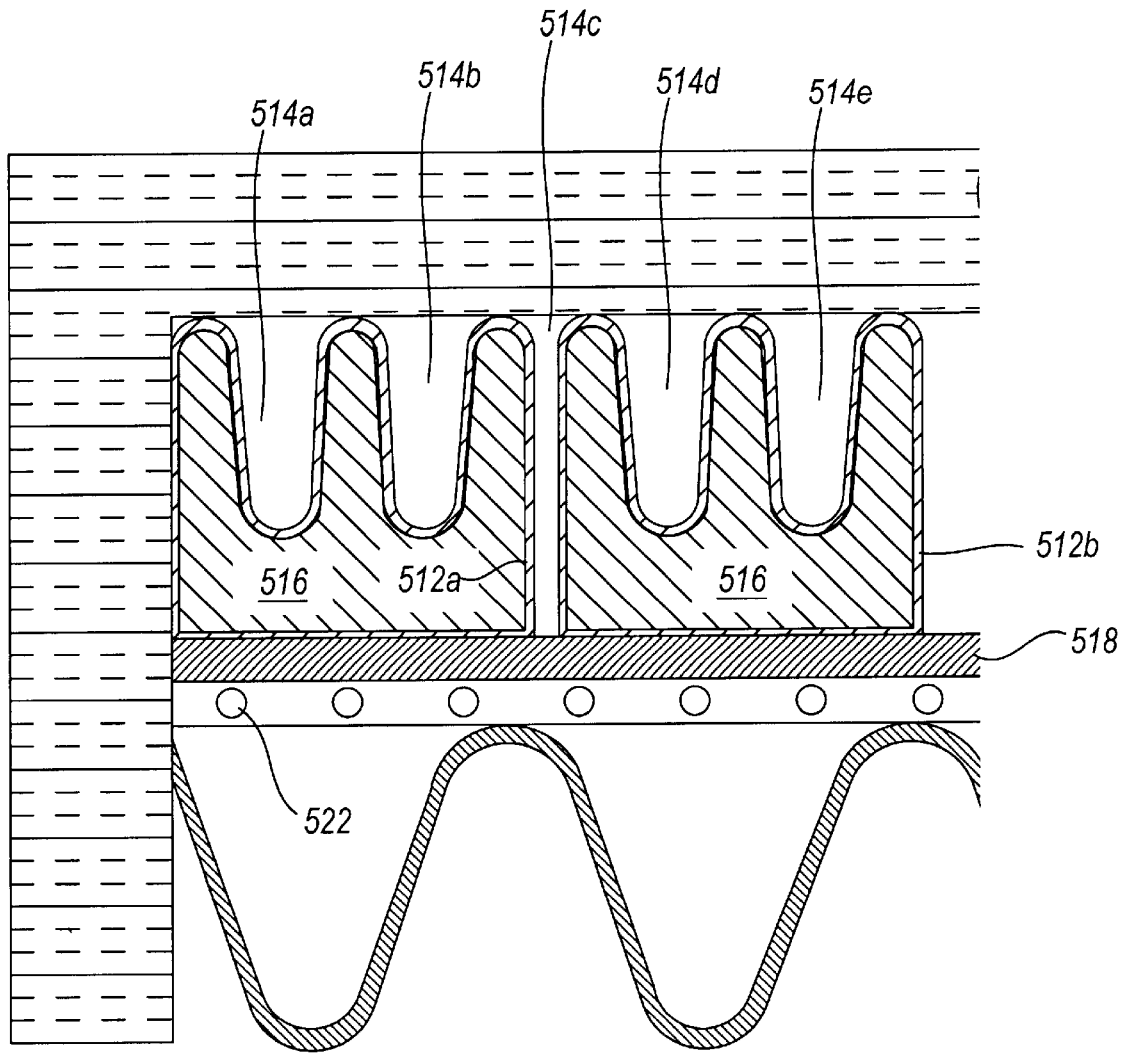
FIG. 5 is a partial cross-sectional view of a heat storage unit according to an embodiment of the present invention.

As depicted in FIGS. 4 and 5, in one embodiment, the thermal storage unit provides a plurality of capsules 512a, 512b, 512c preferably configured to define a plurality of channels 514a–e. The capsules 512a,b, and c contain a thermal storage medium 516. A number of materials can be used as the thermal storage medium. Preferably, the thermal storage medium has a relatively low cost, a relatively high latent heat of melting/freezing and a melting/freezing point lower than the highest anticipated ambient air temperature. In one embodiment, the transfer medium is a calcium chlorate hydrate. Other possible media is useable in connection with the present invention include other salt hydrates such as hydrates of sodium sulfate or disocium phosphate, waxes or other organics such as paraffin or artificial spermacetti. Other suitable materials will be apparent to those of skill in the art after understanding the present disclosure.

In the preferred embodiments, the frozen heat storage medium has a density greater than liquid heat storage medium. Accordingly, the capsules 512 are contacted on their lower surfaces with the heat transfer plate 518 which is in contact with the coils of a working fluid conduit 522. Preferably, the coils 522, plates 518 and capsule 512 are formed of a substantially thermally conductive material, and one which is preferably relatively low cost, such as steel, copper or other metals or metal alloys. During a melting phase of operation, working fluid circulating through the coils 522 provides heat which transferred through the plate 512 and capsule 518 to the thermal storage material 516 which begins to melt. Preferably, the storage material 516 is selected, and the capsule 512 is configured and selected, such that the melting heat storage material easily releases from the walls of the capsule 512. Thus, less-dense, liquid heat storage medium rises to the top of the capsules 512 and the still-solid medium migrates downward to remain substantially near, or in contact with, the plate 512 to provide efficient melting and/or heating of the thermal storage medium.

During the freezing phase of operation, a fan or blower 412 draws ambient air in 414 causing it to go through the channels 514a–e providing relatively efficient heat transfer for cooling and/or freezing the thermal storage medium 516.

Figure 6:
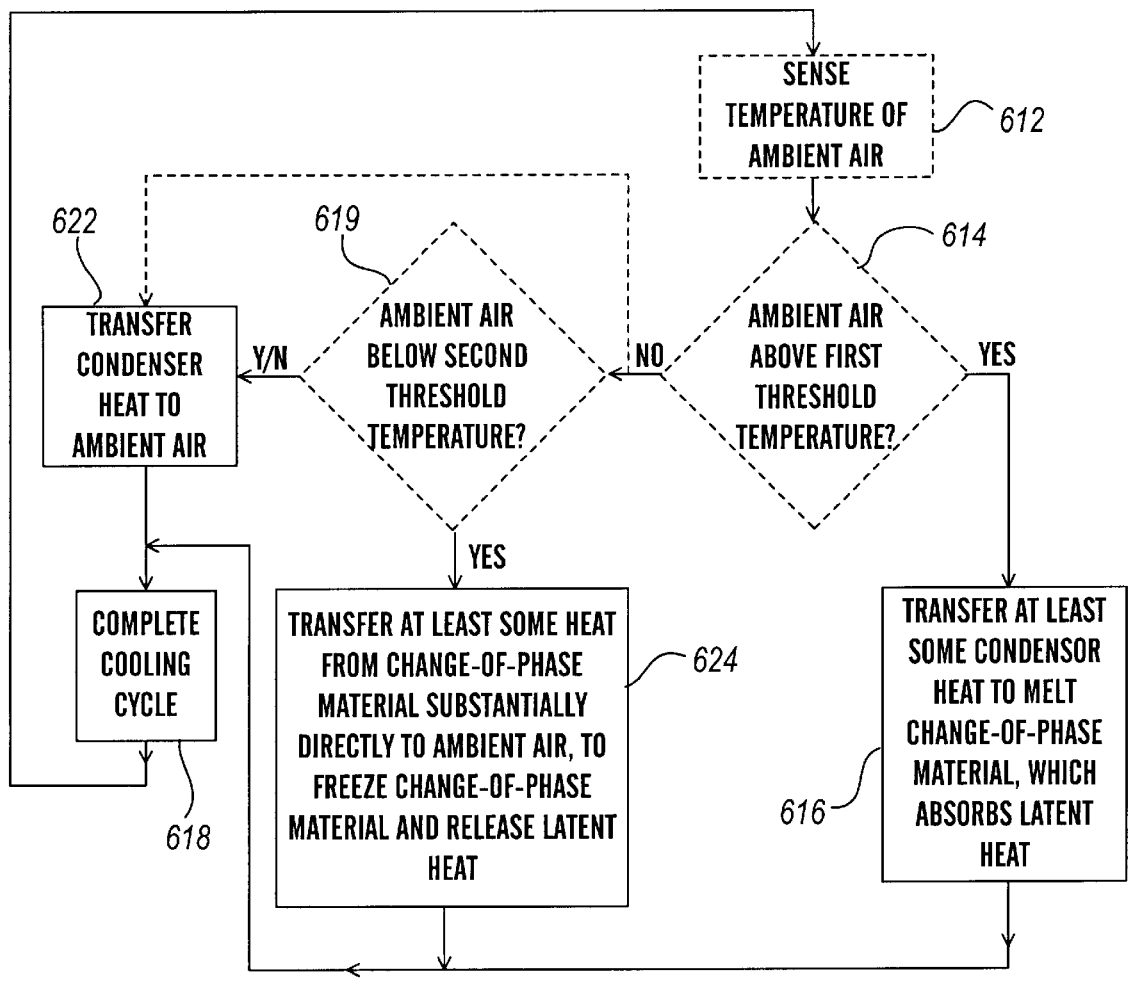
FIG. 6 is a flow chart of a process according to an embodiment of the present invention.

In operation, as depicted in FIG. 6, when the sensing of ambient air temperature 612 indicates that ambient air temperature is above a first threshold temperature, such as the melting point of the storage material, 614, at least some of the working fluid heat in the condenser is transferred to the storage material which is preferably a change-of-phase material, which, in melting, absorbs latent heat form the working fluid 616. The thus-cooled working fluid is eventually provided to the expansion valve 118 and evaporator 112 to complete the cooling cycle 618. If the sensed temperature of the ambient air is not above the first threshold temperature, the working fluid heat in the condenser can be transferred directly to the ambient air, if desired 622, and the cooling cycle completed 618. If the ambient air is also below a second threshold temperature 618 (which may be less than or equal to the first threshold temperature) heat from the change of phase material (i.e., the thermal storage medium) is transferred substantially directly to ambient air, e.g., by blowing ambient air through passages which are in thermal communication with the change of phase material, to lower the temperature and/or freeze the change of phase material thus releasing latent heat to the ambient air 624.

In light of the above description, a number of advantages of the present invention can be seen. The present invention makes it practical to provide a refrigeration cycle when the working fluid temperature is not substantially above the ambient air temperature, while avoiding the need for using an energy consumptive refrigeration cycle (i.e., other than energy consumption for, e.g., a fan) to cool the thermal storage medium. The present invention can provide for reduced consumption of energy by a compressor under high ambient air temperature conditions, potentially also reducing wear or strain on condenser or condenser components. The present invention can reduce air conditioning costs by lowering the energy consumption during those periods when energy demand is likely to be high and energy costs may be higher than other periods. The present invention can provide an improved air conditioning system which is fundamentally more efficient. Without wishing to be bound by any theory, it is believed at least some increase in efficiency during high ambient air temperature periods arises from the ability to reject heat to a temperature which is lower than ambient (i.e., considering the Carnot principle).

A number of variations of modifications of the present invention can be used. It is possible to use some features of the invention without using others. For example, it is possible to use a mode of transferring working fluid into a thermal storage medium without sensing ambient air temperature as a bases for using such a mode. Although some embodiments provide for storing heat in the phase change material only when temperatures of ambient air exceeds a threshold, it is also possible to provide systems in which heat is stored in the change of phase material at certain times of day or substantially continuously during any refrigeration cycle. Although in some embodiments, the heat storage medium is cooled by ambient air at times when ambient air temperatures are below a predetermined threshold temperature, it is also possible to perform air-cooling of the heat storage medium at certain times of day and/or to provide ambient air flow over melted medium substantially continuously during certain periods of time. Although embodiments of the present invention provides for cooling the working fluid without the need for using a refrigeration unit for this purpose, it is also possible to provide configurations in which air-cooling of the heat storage medium as supplemented by other cooling procedures. Although embodiments have been described in which direct heat transfer is used for both heating the storage medium (e.g., direct transfer from the refrigeration working fluid to the heat storage medium) and cooling the heat storage medium (e.g., direct contact of air flow, during low temperature periods, with containers of the heat storage medium). It is also possible to use a secondary heat transfer material or system for either or both of these heat transfer steps.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing reduced energy consumption of a cooling unit for cooling at least a first space, the cooling unit having a compressor, for compressing a working fluid, a condenser and an evaporator, the method comprising:

transferring at least first heat to a first change-of-phase heat storage material having a first temperature, at least during a first time period, whereby at least some of said first change-of-phase material changes from a first phase to a second phase and absorbs latent heat, and wherein said first phase is substantially solid and said second phase is substantially liquid;

transferring heat from said change-of-phage material to said ambient air, without transferring heat from said change-of-phase material directly to said working fluid, at least during a second time period, whereby at least some of said change-of-phase material changes phase from said second phase to said first phase and releases latent heat.

2. A method as claimed in claim 1 wherein said first phase is substantially solid and said second phase is substantially liquid.

3. A method, as claimed in claim 1, wherein said cooling unit is a refrigeration unit.

4. A method as claimed in claim 1 wherein said change-of-phase material comprises a salt hydrate.

5. A method as claimed in claim 1 wherein said step of transferring at least first heat to a first change-of-phase heat storage material is performed at selectable times of day.

6. A method as claimed in claim 1 wherein said step of transferring at least first heat to a first change-of-phase heat storage material is performed without restricting said transferring to a predefined time of day.

7. A method as claimed in claim 1 wherein said step of transferring at least first heat to a first change-of-phase heat storage material is performed substantially continuously whenever said working fluid is output from said condenser.

8. A method as claimed in claim 1 wherein said step of transferring heat from said change-of-phase material to said ambient air is performed at selectable times of day.

9. A method, as claimed in claim 1, further comprising sensing the temperature of said ambient air.

10. A method as claimed in claim 1 wherein said step of transferring at least first heat to a first change-of-phase heat storage material is performed substantially only when the temperature of said ambient air is above a first threshold temperature.

11. A method as claimed in claim 10, further comprising sensing whether temperature of ambient air is above or below said first threshold temperature.

12. A method as claimed in claim 10 wherein said first threshold temperature is between about 85 F. and about 100 F.

13. A method as claimed in claim 10 wherein said first threshold temperature is greater than or equal to about a melting point of said change-of-phase material.

14. A method as claimed in claim 10 further comprising transferring at least some of said first heat to ambient air at least when temperature of said ambient air is below a second threshold temperature.

15. A method as claimed in claim 14 wherein said second threshold temperature is between about 70 F. and about 80 F.

16. A method, as claimed in claim 14, wherein said step of transferring at least some of said first heat to ambient air comprising providing a flow of ambient air over said condenser at least when said ambient air is below said second threshold temperature.

17. A method as claimed in claim 10 wherein said step of transferring heat from said change-of-phase material to said ambient air is performed substantially only when said temperature of said ambient air is below a second threshold temperature.

18. A method as claimed in claim 17 wherein said second threshold temperature is less than or equal to a melting point of said change-of-phase material.

19. A method as claimed in claim 17 wherein said first threshold temperature is about equal to said second threshold temperature.

20. A method as claimed in claim 17 wherein said first threshold temperature is greater than said second threshold temperature.

21. A method, as claimed in claim 17, wherein at least one of said first and second threshold temperatures is selectable.

22. A method, as claimed in claim 1 wherein said change of phase comprises at least partially melting said change-of-phase material.

23. A method, as claimed in claim 22, further comprising, during a third time period, following said second time period, re-melting at least a portion of said change-of-phase material.

24. A method, as claimed in claim 1, wherein said step of transferring heat from said change-of-phase material is performed by causing a flow of ambient air over at least a first container of change-of-phase material.

25. A method, as claimed in claim 24, wherein said container provides a plurality of spaced-apart air channels.

26. A method, as claimed in claim 24 further comprising retrofitting an in-service cooling unit by coupling at least said container between the output of said condenser and said first space.

27. A method, as claimed in claim 24, further comprising providing a single housing containing both said compressor and said container.

28. A method, as claimed in claim 24, further comprising providing a single housing containing both said condenser and said container.

29. Apparatus for providing reduced energy consumption of a cooling unit for cooling at least a first space, the cooling unit having a compressor, for compressing a working fluid, a condenser and an evaporator, comprising:

means for transferring at least first heat to a first change-of-phase heat storage material having a first temperature, at least during a first time period, whereby at least some of said first change-of-phase material changes from a substantially solid first phase to a substantially liquid second phase and absorbs latent heat;

means for transferring heat from said change-of-phase material to said ambient air, without transferring heat from said change-of-phase material directly to said working fluid, at least during a second time period, whereby at least some of said change-of-phase material changes phase from said substantially liquid second phase to said substantially solid first phase and releases latent heat.

30. Apparatus for providing reduced energy consumption of a cooling unit for cooling at least a first space, the cooling unit having a compressor, for compressing a working fluid, a condenser and an evaporator, comprising:

a condenser coil positioned in thermal communication with a first change-of-phase heat storage material wherein at least first heat is transferred to said first change-of-phase heat storage material having a first temperature, at least during a first time period, whereby at least some of said first change-of-phase material changes from a substantially solid first phase to a substantially liquid second phase and absorbs latent heat;

at least a first fan controlled to provide air flow of ambient air in substantial thermal communication with said change-of-phase material wherein heat from said change-of-phase material is transferred to said ambient air, without transferring heat from said change-of-phase material directly to said working fluid, at least during a second time period, whereby at least some of said change-of-phase material changes phase from said substantially liquid second phase to said substantially solid first phase and releases latent heat.

\* \* \* \* \*